Figure 1:
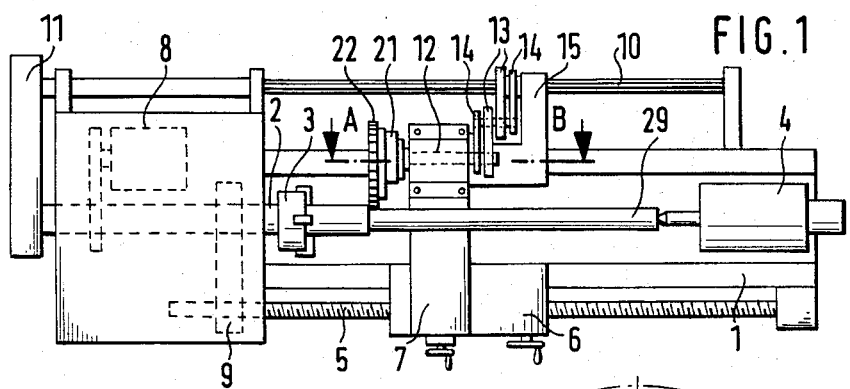

United States Patent [19]

Gödecke et al.

[11] Patent Number: 4,538,945
[45] Date of Patent: Sep. 3, 1985

[54] APPARATUS FOR MACHINING A POLYGON PROFILE ON A WORKPIECE

[75] Inventors: Paul Gödecke; Otto Meichel, both of Neutraubling, Fed. Rep. of Germany

[73] Assignee: Krones Ag Hermann Kronseder Maschinenfabrik, Neutrabling, Fed. Rep. of Germany

[21] Appl. No.: 536,691

[22] Filed: Sep. 28, 1983

[30] Foreign Application Priority Data

Oct. 16, 1982 [DE] Fed. Rep. of Germany ....... 3238442

[51] Int. Cl.³ .............................. B23C 3/04; B23C 3/24
[52] U.S. Cl. ........................................ 409/157; 29/57; 409/166; 409/200; 409/240
[58] Field of Search .................... 29/57; 409/157, 166, 409/200, 141, 232, 233, 234, 240; 279/6

[56] References Cited

U.S. PATENT DOCUMENTS

| | | | |
|---|---|---|---|
| 1,485,687 | 3/1924 | Melling | 409/240 X |
| 3,827,318 | 8/1974 | Sorenson | 29/57 X |
| 4,074,778 | 2/1978 | Morrell et al. | 279/6 X |
| 4,124,927 | 11/1978 | Sorenson | 29/57 X |

FOREIGN PATENT DOCUMENTS

| | | | |
|---|---|---|---|
| 133283 | 8/1902 | Fed. Rep. of Germany | |
| 0120541 | 12/1947 | Sweden | 279/6 |
| 0613927 | 6/1978 | U.S.S.R. | 409/232 |

*Primary Examiner*—Z. R. Bilinsky
*Attorney, Agent, or Firm*—Christie, Parker & Hale

[57] ABSTRACT

In an apparatus for machining polygon profiles, comprising a workpiece spindle and a tool spindle (12) driven in synchronism therewith and carrying an eccentric tool (22), wherein the transmission ratio between the workpiece spindle and the tool spindle as well as the lateral distance therebetween are adjustable, the invention provides for additional adjustment of the eccentricity of the tool. This permits one and the same tool to be employed for pre-cutting various polygon profiles of any standard nominal size in a rational manner and with close approach to the final profile shape. The cutting speed is increased by providing a disk-shaped counterweight (21) with adjustable eccentricity located on the tool spindle adjacent the tool. A common adjustment means (18, 24 to 27) is effective to automatically adjust the eccentricity of the counterweight in correspondence to the respective eccentricity of the tool.

20 Claims, 4 Drawing Figures

APPARATUS FOR MACHINING A POLYGON PROFILE ON A WORKPIECE

The invention relates to apparatus for machining a polygon profile on a workpiece.

Already known is an apparatus of this type, wherein both the transmission ratio between the workpiece spindle and the tool spindle, and the distance between the axes of rotation of the workpiece and of the tool are variable, without there being provided any further adjustment possibility. This apparatus permits one and the same tool, for instance a disk cutter, to be employed for machining polygon profiles with varying numbers of edges and different diameters, but not for forming profiles with varying eccentricity. There is thus required a special tool for each eccentricity. If this known apparatus were thus to be employed for pre-cutting P3G profiles according to DIN 32 711 or P4C profiles according to DIN 32 712, a separate tool would be required for each nominal size associated with a specific degree of eccentricity. The rational pre-cutting of polygon profiles is therefore not possible with the known apparatus.

Also known is an apparatus for turning polygon profiles wherein a tool carriage carrying a lathe tool is driven by a crank pin and a linkage to oscillate in synchronism with the rotation of the workpiece spindle (DE-PS 133 283). This apparatus permits various elliptical shapes to be machined by adjusting the crank pin and a crank pin of the linkage accordingly. This known apparatus is therefore not either suitable for economically pre-cutting polygon profiles of varying shapes. Also, this apparatus is of rather complicated construction with a great number of driving and bearing elements, and the oscillating parts have a considerable mass, resulting in uneven running detracting from the precision of operation particularly at increased working speeds. It is the main object of the present invention to improve the apparatus defined in the introduction by simple means and to such effect that it may be employed for machining polygon profiles with varying numbers of edges and with varying nominal sizes without requiring the cutting tool to be changed.

In accordance with the invention, this object is attained by providing for the adjustable, eccentric mounting of the machining tool relative to the tool spindle.

In the apparatus according to the invention, a changeover to a polygon profile having a different degree of eccentricity does not require the cutting tool to be changed, in place of which the degree of eccentricity of the tool has merely to be adjusted in a quick and simple operation. Thanks to this characteristic feature in combination with the possibility to vary the transmission ratio between the workpiece spindle and the tool spindle as well as the distance between the axes thereof, the apparatus according to the invention is unique in permitting one and the same tool, for instance a cutter head with metal carbide inserts, to be employed for rationally precutting polygon profiles of any shape and size, particularly P3G and P4C profiles of any nominal size. In this context, the approximation to the ideal polygon shape is the closer, the greater the diameter of the tool, and as there is only one tool required, it may be selected to be of considerable size.

A preferred embodiment of the invention permits the tool to be accurately balanced in a simple manner for each degree of eccentricity, so that it is possible to attain high rotary speeds and cutting speeds without excessive load on the apparatus, particularly on the mounting and drive arrangement of the tool spindle. In the case of a cutter head having a diameter of about 350 mm and carrying 32 metal carbide cutters, with the maximum degree of eccentricity being 8 mm, as generally considered sufficient for machining conventional polygon profiles, it is thus possible to attain operating speeds of 1,000 rpm without difficulty.

A preferred further aspect of the invention permits the change over to a different polygon profile to be carried out in a particularly rapid and simple manner, as the adjustment of the tool eccentricity automatically results in a corresponding adjustment of the counterweight, so that the latter does not have to be adjusted separately.

Set forth are a number of advantageous further aspects of the invention contributing to a simple construction of the common adjustment provisions for the tool and counterweight, and to an accurate fixation of the tool and counterweight relative to one another.

Finally, the aspect of the invention contributes to a particularly smooth low-wear running of the apparatus, as the two toothed belts are effective to dampen any remaining unbalance.

Figure 3:
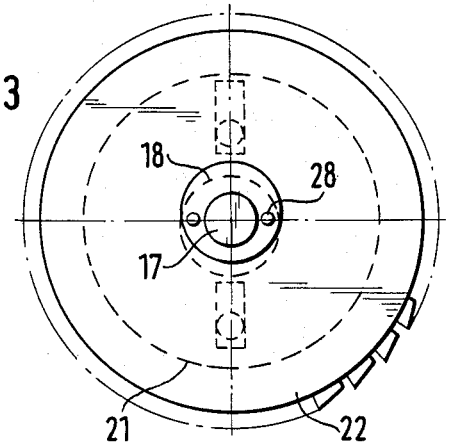
Figure 2:
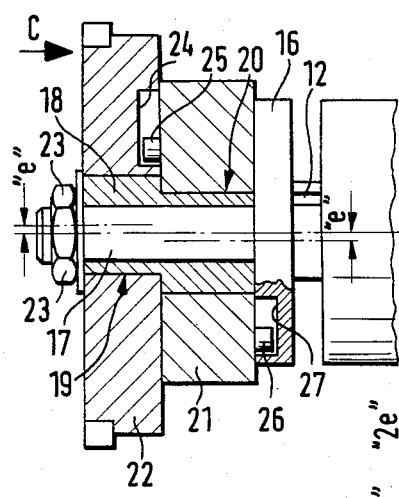
Figure 4:
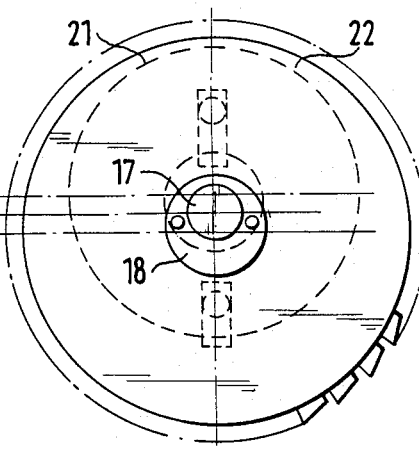

An exemplary embodiment of the invention shall now be described with reference to the accompanying drawings, wherein:

FIG. 1 shows a diagrammatic top plan view of an apparatus for machining polygon profiles, FIG. 2 shows a sectional view according to the line A-B in FIG. 1 on an enlarged scale, FIG. 3 shows an end view in the direction of arrow C in FIG. 2 with concentric arrangement of tool spindle and cutter head, and FIG. 4 shows an end view in the direction of arrow C in FIG. 2 with the maximum eccentric displacement between the tool spindle and the cutter head.

The apparatus shown in FIGS. 1 to 4 substantially consists of a conventional turning lathe comprising a base frame 1, a workpiece spindle 2 carrying a chuck 3, a tailstock 4, a screw spindle 5, a support carriage 6 mounted for sliding movement parallel to the axis of rotation of the workpiece spindle 2, and a tool carriage 7 mounted on carriage 6 for movement transversely of the axis of rotation of workpiece spindle 2. Workpiece spindle 2 is driven by a motor 8, and is itself drivingly connected to screw spindle 5 through a variable reduction gear arrangement 9.

Rotatably mounted at the rear of the turning lathe in parallel relationship to workpiece spindle 2 is a splined shaft 10 drivingly connected to workpiece spindle 2 through a variable transmission gear arrangement 11. The transmission ratio between the workpiece spindle and the splined shaft may for instance be selected at 1:3 and 1:4 for pre-cutting the standard polygon profiles P3G and P4C, respectively. Rotatably mounted on tool carriage 7 of support 6 in the region between splined shaft 10 and the axis of rotation of workpiece spindle 2 is a tool spindle 12 extending parallel to workpiece spindle 2 and splined shaft 10, respectively. Tool spindle 12 is driven from splined shaft 10 at a transmission ratio of 1:1 by means of a pair of endless toothed belts 13. The two belts 13 interconnect a total number of four sheaves or gears, the first of which is mounted for axial displacement on splined shaft 10, while the last one is fixedly mounted on the righthand end of tool spindle 12. The two intermediate sheaves are non-rotatably connected to one another and mounted on a shaft carried by a pair of levers 14. One of the two levers 14 is pivotally mounted on splined shaft 10, while the other lever 14 is pivotally mounted on tool spindle 12. The thus formed articulated toothed belt transmission gear arrangement ensures that tool spindle 10 is accurately driven with the speed of splined shaft 10 in any position of support 6 and its tool carriage 7. A guide fork 15 or the like ensures that the sheave mounted on splined shaft 10 always follows the movements of support 6.

The lefthand end portion of tool spindle 12 is formed with a radial flange 16 with a concentric stub shaft 17 projecting therefrom and having a screw thread formed at its end. Rotatably mounted on stub shaft 17 is an eccentric sleeve 18 having two eccentric portions 19 and 20, the eccentricity "e" of which with respect to the axis of the tool spindle is 4 mm in each case, the two eccentric portions 19, 20 being offset by 180° relative to one another. The righthand eccentric portion 20 adjacent flange 16 carries a counterweight 21 in the form of a circular disk rotatably mounted thereon with its inner bore. This inner bore is offset by the distance "e" relative to the center axis of the counterweight, so that the latter is aligned in concentric relationship to the tool spindle axis, as in FIGS. 2 and 3, or is offset relative thereto by the distance "2e", depending on the angular position of eccentric portion 20 and counterweight 21 relative to one another. In the present case, counterweight 21 is thus adjustable to a maximum eccentricity of 8 mm, as in FIG. 4. The other eccentric portion 19 of excenter sleeve 18 carries a tool 22 in the form of a cutter head provided with thirty-two metal carbide cutters and having a diameter of for instance 350 mm. An inner bore of the cutter head for rotatably mounting it on eccentric portion 19 is again offset by the distance "e" relative to the center axis of the cutter head, so that the latter may be aligned in concentric relationship to the tool spindle axis, as in FIGS. 2 and 3, or may be offset relative thereto by the maximum distance "2e", depending on its angular position relative to eccentric portion 19. In the present case, the eccentricity of tool 22 is adjustable between "Zero" and 8 mm. A nut 23 threaded onto the screw thread of stub shaft 17 serves to axially compress tool 22 and counterweight 21 between itself and flange 16 of tool spindle 12. At the same time, excenter sleeve 18 is locked in position thereby, so that no additional clamping element is required for this purpose.

For positive transmission of the torque from tool spindle 12 to tool 22, the end face of the latter facing towards counterweight 21 is formed with a radial slot 24 for engagement with a first crank bolt 25 attached to counterweight 21. Offset by 180° relative to first crank bolt 25, a second crank bolt 26 is attached to the opposite end face of counterweight 21 for engagement with a radial slot 27 formed in flange 16. The crank slot arrangements formed by slot 24 and first bolt 25 and second bolt 26 and slot 27, respectively, are effective to positively connect tool 22 to tool spindle 16 in any angular position of eccentric sleeve 18 relative thereto.

The two crank slot arrangements 24, 25 and 26, 27, respectively, are further effective to form a constraint guidance of tool 22 and counterweight 21 relative to one another and relative to tool spindle 12, so that on rotation of eccentric sleeve 18 for increasing the eccentricity of tool 22, the eccentricity of counterweight 21 is likewise increased in the opposite direction. Similarly, reduction of the eccentricity of tool 22 results in a corresponding reduction of the eccentricity of counterweight 21. While the outer diameter of counterweight 21 is smaller than that of tool 22, its axial width is correspondingly greater than that of the tool, so that the two elements are of substantially identical mass. This is necessary because the two eccentric portions 19 and 20 are of equal size. It is also possible, however, to select eccentric portions of different sizes, in which case the mass of counterweight 21 has to be modified accordingly. It should be mentioned, that in the embodiment described and shown, perfect equilibration, although in any case provided in the maximum eccentricity position "2e" (FIG. 4), is not fully achieved in the intermediate positions between the "0" eccentricity position (FIG. 3) and the maximum eccentricity position "2e". It has been found, however, that the resulting unbalance is of no importance in practical operation. By suitably designing the adjustment means for eccentric sleeve 18, or the guide means for tool 22 and counterweight 21, it is of course also possible to achieve perfect equilibration in any position.

If the eccentricity of tool 22 is to by varied, nut 23 is released, and eccentric sleeve 18 is rotated relative to stub shaft 17. This may be carried out in a simple manner by means of a suitable tool engaging recesses 28 formed in the end face of eccentric sleeve 18. Rotation of sleeve 18 automatically results in a corresponding adjustment also of counterweight 21 for equilibration of the assembly. To complete the adjustment, nut 23 is retightened, whereupon the apparatus is ready for operation.

The above described apparatus is ideally suited for precutting P3G and P4C polygon profiles of any standard nominal size, for instance on a long shaft 29 clamped between the chuck and the tailstock 4. The feed movement of the support 6 required for this operation is automatically brought about by screw spindle 5. Thanks to the large diameter of tool 22 made possible by the automatic equilibration, the desired final profile shape can be approached very closely, so that only a minimum amount of material has to be left remaining for the final shaping on a polygon grinding machine. The conversion to the desired basic profile shape, i.e. a triangular or quadrangular shape, is carried out by suitably adjusting transmission gear 11, adjustment to the desired basic profile diameter by suitable adjustment of tool carrier 7, adjustment to the eccentricity associated with the basic diameter is carried out by adjusting eccentric sleeve 18, and the required feed movement is adjusted by correspondingly adjusting reduction gear 9. It is thus not required to exchange any parts or to employ different cutting tools.

We claim:

1. An improved apparatus for machining a polygon profile on a workpiece including means for rotating the workpiece, a tool spindle and means for rotating the tool spindle in synchronism with the workpiece, the improvement comprising:
   a tool having a circular circumference and a plurality of cutting edges at said circumference;
   means for eccentrically mounting the tool on the tool spindle for oscillatory motion for intermittent engagement with the workpiece for machining a polygonal profile thereon; and
   means for adjusting the eccentricity of the tool relative to the spindle for varying the profile.

2. An apparatus according to claim 1 wherein the mounting and adjusting means includes an eccentric sleeve disposed between the tool spindle and said tool, the tool including an eccentric bore for mounting the tool to said sleeve and spindle, said eccentric sleeve being adapted to be rotated relative to both said tool spindle and the tool to adjust the eccentricity of the tool.

3. An apparatus according to claim 2 wherein the eccentricity of the bore for the tool is equal to the eccentricity of the sleeve whereby the eccentricity of the tool may be adjusted relative to the spindle from zero eccentricity to twice the eccentricity of said bore.

4. The apparatus of claim 1 wherein the means for eccentrically mounting the tool on the tool spindle includes a bolt on one said tool or said spindle and a slot on the other of said tool or spindle, the bolt adapted to be received by the slot for coupling the tool to the spindle while providing for the means for adjusting the eccentricity.

5. The apparatus of claim 1 wherein the mounting means includes a shoulder on a tool spindle and a clamping element adapted to clamp the tool against the shoulder.

6. The apparatus according to claim 1 further including a counterweight and means for mounting the counterweight to the tool spindle to counteract the forces generated by the oscillatory motion of the tool and thereby balance the apparatus.

7. The apparatus according to claim 6 wherein the counterweight mounting means includes an adjustable eccentric coupling of the counterweight to the spindle.

8. The apparatus according to claim 7 including an eccentric sleeve disposed between the tool spindle and the counterweight, the counterweight provided with an eccentric bore for mounting the counterweight to the sleeve, said eccentric sleeve being adapted to be rotated relative to both the tool spindle and the counterweight to adjust the eccentricity of the counterweight.

9. The apparatus according to claim 7 including a common adjustment means for adjusting the eccentricity of both said tool and said counterweight to balance the apparatus, said adjustment means adapted to increase the eccentricity of the counterweight upon the increasing of the eccentricity of the tool and decreasing the eccentricity of the counterweight upon decreasing the eccentricity of the tool.

10. An apparatus according to claim 9 wherein the common adjustment means includes a sleeve having oppositely directed eccentric portions, the sleeve disposed between the tool and counterweight in the spindle.

11. An apparatus according to claim 1 including a sleeve disposed on the spindle, the sleeve having axially spaced, oppositely directed eccentric portions, the tool including an eccentric bore to receive one of said portions for mounting the tool to said sleeve one portion and the spindle, the apparatus further including a cylindrical counterweight having an eccentric bore to receive the other of said portions for mounting the counterweight to the sleeve and the spindle, said sleeve adapted to be rotated relative to the spindle to adjust the eccentricity of the tool and for a corresponding opposite adjustment of the eccentricity of the counterweight to balance the forces generated by the oscillatory motion of the tool.

12. The apparatus of claim 11 further including a shoulder on the spindle and a clamping element for clamping the tool and counterweight against said shoulder.

13. The apparatus of claim 11 including a bolt disposed on one of said tool or counterweight, the bolt received in a slot on the other of said tool or counterweight to couple said tool and counterweight against relative rotation.

14. The apparatus of claim 13 wherein said counterweight is disposed adjacent the shoulder, one of said counterweight or shoulder including a second bolt received by a second slot disposed in the other of said counterweight and shoulder for coupling the counterweight to the shoulder against relative rotation.

15. The apparatus of claim 14 wherein said second bolt is offset 180° from the first bolt.

16. The apparatus of claim 1 further including articulated transmission means for rotating the spindle including a pair of toothed belts for transmitting rotary power to said spindle, each of said belts coupled to a movable idler shaft, one of said belts driven by driving means to rotate the idler shaft and the second belt and the second belt coupled to and driving the tool spindle.

17. The apparatus of claim 16 further including a counterweight, means for eccentrically mounting the counterweight to the tool spindle and means for adjusting the eccentricity of the counterweight to counteract the forces generated by the oscillatory motion of the tool and to thereby balance the apparatus.

18. An apparatus for machining a polygonal profile on a workpiece comprising:
a workpiece spindle for holding and rotating the workpiece;
a tool spindle movable relative to the workpiece;
means for rotating the workpiece and tool spindle in synchronism;
means for eccentrically mounting a tool on the tool spindle such that rotation of the spindle causess the tool to oscillate to intermittently engage the workpiece to machine a polygonal profile thereon; and
means for adjusting the eccentricity of the tool on the tool spindle for machining different profiles on the workpiece.

19. An apparatus for machining a polygon profile on the workpiece comprising:
a tool spindle;
means for rotating the workpiece and the tool spindle in synchronism;
a machining tool having an eccentric bore;
a first sleeve portion mounted on the tool spindle, the first sleeve portion being eccentric relative to the tool spindle and adapted to be received by the tool bore to eccentrically mount the tool on the tool spindle, rotation of the tool spindle causing the tool to eccentrically revolve to intermittently engage the workpiece to machine a polygonial profile thereon;
a counterweight having an eccentric bore;
a second sleeve portion mounted on the tool spindle, the second sleeve portion being eccentric relative to the tool spindle and offset 180 degrees with respect to the eccentricity of the first sleeve portion and adapted to be received by the counterweight bore to eccentrically mount the counterweight on the tool spindle, the forces generated by the eccentric revolutions of the tool being counteracted by eccentric revolutions of the counterweight to balance the tool spindle; and
means for cooperatively adjusting the eccentricity of the tool and counterweight to machine different profiles and balance the spindle.

20. The apparatus of claim 19 wherein the sleeve first and second portions are rigidly corrected, the adjusting means including rotation of the sleeve portions relative to the tool spindle.

* * * * *

UNITED STATES PATENT AND TRADEMARK OFFICE
CERTIFICATE OF CORRECTION

PATENT NO. : 4,538,945
DATED : 3 September 1985
INVENTOR(S) : PAUL GODECKE; OTTO MEICHEL It is certified that error appears in the above-identified patent and that said Letters Patent is hereby corrected as shown below:

Column 3, line 30, "excenter" should be -- eccentric --.

Column 3, line 45, "excenter" should be -- eccentric --.

Column 6, line 18, "claim 16" should be -- claim 18 --.

Column 6, line 49, "polygonial" should be -- polygonal --.

Signed and Sealed this

Fourteenth Day of January 1986

[SEAL]

Attest:

DONALD J. QUIGG

Attesting Officer

Commissioner of Patents and Trademarks